UNITED STATES PATENT OFFICE 2,491,462

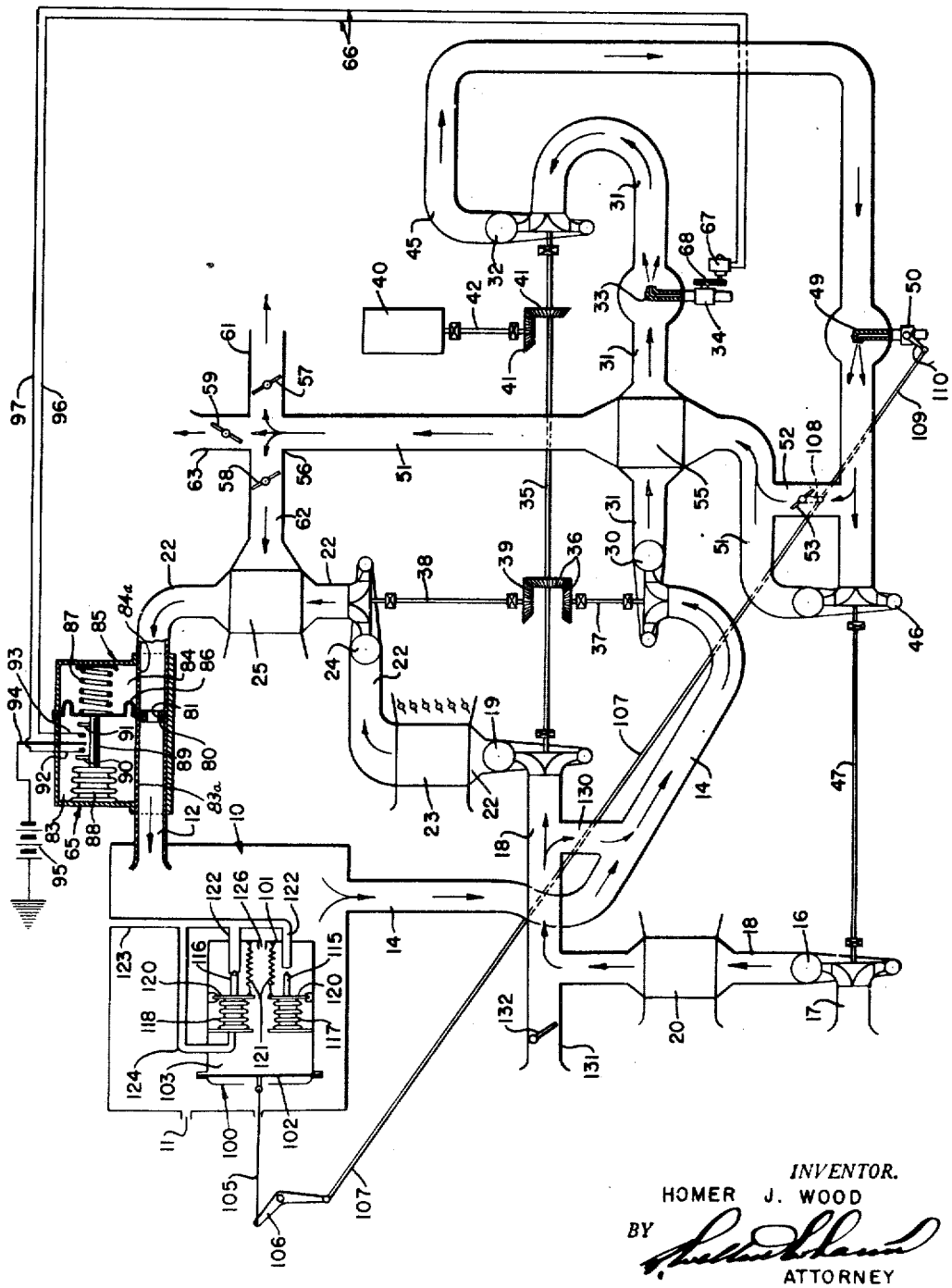

GAS TURBINE DRIVEN AIR CONDITIONING AND AUXILIARY DRIVE SYSTEM

Homer J. Wood, Los Angeles, Calif., assignor to The Garrett Corporation, Los Angeles, Calif., a corporation of California Application April 6, 1946, Serial No. 660,179

14 Claims. (Cl. 98—1.5)

This invention relates to a method and a system whereby air is suitably conditioned and circulated through an enclosure or space at a predetermined or desired rate of flow and under a predetermined or desired density or pressure. The form of my invention disclosed herein is designed for, but not limited to, use in aircraft, particularly those which fly at high altitudes, and functions to circulate air through the passenger or pilot compartments at the desired flow rate and pressure.

It is an object of my invention to provide a method and system of this character which will have at all altitudes a reduced fuel consumption, as compared with other systems.

It is a further object of my invention to provide a method and system in which the exhaust cabin air instead of being immediately released to the atmosphere is further circulated in the system and its useful energy extracted.

It is another object of my invention to provide a method and system for conditioning air for a cabin in which additional fresh air is injected into the system in order to maintain the desired air pressure in the cabin.

It is a still further object of my invention to provide a method and system, as pointed out heretofore, which incorporates power turbine means which is operated to maintain a substantially constant flow-rate of air, and which also incorporates means for adding additional air necessary to maintain cabin pressure, this last mentioned means being operable at variable speeds and under the control of pressure sensitive means located in the cabin.

It is also an object of my invention to provide a method and system in which ambient air or fresh air is delivered to the cabin through a means for supplying conditioned air to the cabin, and in which exhaust cabin air is delivered to power turbine means which drives the compressors of the system.

It is a further object of my invention to provide a method and a system in which any air required by the power turbine means, in addition to the exhaust cabin air, is supplied to the power turbine means by the means which delivers fresh air into the system.

Another object of the invention is to provide a method and system as pointed out heretofore, in which there is a primary compressor which supplies fresh air to the system, which primary compressor is driven at such a speed as to maintain the air flowing through the cabin at the desired pressure.

In the drawing I have illustrated schematically a system incorporating the features of my invention. I will now describe the form of my invention illustrated herein, and in the course of the description, will refer to the objects and advantages of the invention in addition to those pointed out heretofore.

The numeral 10 represents the cabin of an aircraft. It should be understood, however, that when the term cabin is employed, the term is to be broadly construed to mean any space or enclosure to which conditioned air may be supplied. Since a cabin of an aircraft has some leakage which must be replaced in a pressurized system, I have indicated at 11 such a cabin leakage.

The cabin 10 is supplied with conditioned air through an inlet conduit 12 which constitutes a part of the conduit for supplying conditioned air to the cabin. Air is exhausted from the cabin 10 through an outlet conduit 14, which, as will be pointed out hereinafter, supplies cabin exhaust air to the power turbine means of the invention. The system which will now be described is designed to supply air to the cabin 10 so that there is the desired pressure and rate of circulation.

Ambient air first enters a primary compressor 16 through an inlet 17. The ambient air is compressed by the compressor 16 and flows through a conduit 18 to an air compressor 19. The conduit 18 includes a cooler 20 which extracts heat from the air flowing through the conduit 18. The compressor 16 and conduit 18, along with the cooler 20, if it is employed, constitutes an air replenishment means for supplying additional air to the system.

The compressor 19 compresses the air which it receives from the conduit 18 and delivers it through the conduit 22 to the cabin 10, the air inlet 12 constituting a part of the conduit 22. This conduit 22 incorporates various air conditioning means, such, for example, as the cooler 23, the cooling turbine 24, and the heater 25. The compressor 19 compresses the air which it receives and passes it through the cooler 23 which extracts some heat from the air, whereafter the air is delivered to the cooling turbine 24, wherein additional heat is extracted from this air and its pressure reduced. The air then flows through the heater 25 and from the heater 25 through the conduit 22 and into the cabin 10. The air conditioning units 23, 24, and 25 may be suitably controlled so that the air which enters the cabin 10 is at the desired air temperature. The compressor 19 and conduit 22, along with any air conditioning means which may be employed therein, constitutes a cabin air supply means for supplying conditioned air to the cabin.

The cabin exhaust air flows through the outlet 14 which constitutes an air conduit for delivering cabin exhaust air to a compressor 30. The compressor 30 compresses the air and delivers it to a conduit 31 which is connected to and delivers the air under heat and pressure to a power turbine 32. For increasing the heat and volume of the air flowing to the turbine 32 I provide a burner 33 supplied with fuel in amounts as determined by the position of a control valve 34. The power turbine 32 is adapted to drive the air compressors 19 and 30, and this is accomplished by suitable drive means such as drive shaft 35, beveled gears 36 and the driven shaft 37. Since the cooling turbine 24 develops useful energy, this energy in the form of the invention illustrated herein, is employed to assist in driving the compressors 19 and 30. To accomplish this, there is provided a drive shaft 38 and a beveled gear 39 which meshes with one of the beveled gears 36. Since there is usually an excess of power, my invention may provide a power utilizing means such, for example, as a generator 40, driven from the shaft 35 by beveled gears 41 and shaft 42.

The power turbine 32 delivers its exhaust into a conduit 45, which conduit 45 delivers the hot gases to a second driving turbine 46, which is connected by a drive shaft 47 to drive the primary compressor 16. If additional heating of the gases is required to obtain necessary pressure to properly operate the turbine 46, I then provide a burner 49 having a control valve 50. The driving turbine 46 delivers its exhaust gas into a conduit 51.

Bypassing the driving turbine 46 is a bypass conduit 52 having a valve 53. The position of the valve 53 determines how much of the hot gas is permitted to bypass the driving turbine 46. When the valve 53 is closed, the turbine 46 is driven at its maximum speed; whereas, when the valve 53 is fully opened, the turbine 46 is driven at its minimum speed. Therefore, by controlling the position of the valve 53 the speed at which the compressor 16 is driven is also controlled.

The compressor 30, the power turbine 32, the driving turbine 46 and the necessary burners and conduits constitute the power turbine means of my invention.

Rather than waste the energy which remains in the hot gases exhausted from the driving turbine 46, I pass the hot gases through a heat exchanger 55 located in the conduit 31, and thus supply some additional heat to the air passing therethrough. The conduit 51 may be connected through a suitable cross-connection 56 so that by proper operation of the valves 57, 58, or 59, the hot air may be supplied respectively to a conduit 61 which may extend to wing de-icing means, conduit 62 which may extend to the heater 25 or the conduit 63 which may exhaust the gases to the atmosphere.

For the purpose of controlling the rate of flow of conditioned air into the cabin 10, the power turbine 32 is driven at a substantially constant rate of speed. This may be done by the use of a suitable governor, but in the form of my invention disclosed herein, I provide means in the form of a flow meter 65 which is connected by electric circuit 66 to a reversible motor 67, which, through gears 68, opens or closes the valve 34, thus controlling the amount of fuel supplied to the burner 33. The flow meter 65 includes a baffle 80 positioned in the conduit 22, which baffle provides an orifice 81 which produces a pressure drop. This pressure drop is reflected in the chambers 83 and 84 of the casing 85, the chambers being positioned on opposite sides of a diaphragm 86 and communicating with the conduit 12 by means of the openings 83a and 84a. A spring 87 is provided in the chamber 84 which exerts a pull on the diaphragm 86, which is balanced by the pull of evacuated bellows 88 connected to the diaphragm by a shaft 89. The shaft 89 carries a pair of actuating fingers 90 and 91 which are adapted respectively to move contacts 92 and 93 into engagement with a central contact 94, which is connected to a source of current 95. Conductors 96 and 97 constituting the electric circuit 66 are connected respectively to the contacts 92 and 93.

When the flow in the conduit 22 varies from the prescribed value, the change in pressure drop across the orifice 81 will cause the diaphragm 86 to move in a direction to close the proper circuit and drive the motor 67 in a direction to open or close the valve 34, thus increasing or decreasing the rate of speed of the power turbine 32, and thus increase or decrease the rate of speed of the compressors 19 and 30.

The means just described constitutes governor means or constant flow means whereby there will be constant flow conditioned air through the cabin 10.

In addition to controlling the rate of flow of air through the cabin, it is also necessary to control the pressure of the air. This is done by controlling the speed of the primary compressor 16 so that it supplies necessary replenishment air to maintain air pressures. The speed of the primary compressor 16 is controlled by a pressure controlled unit 100. The control unit 100 has a casing member 101 and a diaphragm 102 cooperating therewith to define a control chamber 103, in which there is a pressure corresponding to cabin pressure requirements. The pressure thus maintained within the control chamber 103 is balanced through the diaphragm 102 against the actual pressure within the cabin, which pressure is exerted against the outer face of the diaphragm. Accordingly, whenever cabin pressure tends to drop below the required level determined by the pressure within the control chamber 103, the diaphragm 102 will move outwardly, and whenever the cabin pressure rises above the pressure within the control chamber 103, the diaphragm 102 will move inwardly.

The diaphragm 102 is connected by a rod 105 to a bellcrank 106; and the bellcrank 106 is connected by a rod 107 to a lever 108 on the bypass valve 53. Thus, it will be seen that when the pressure in the cabin drops below a predetermined pressure, the diaphragm moves outwardly and thus rotates the bellcrank in an anticlockwise direction. This causes the valve 53 to move towards closed position and delivers a greater proportion of the hot gases to the driving turbine 46, thus increasing its speed which, in turn, increases the speed of the primary compressor 16 and supplies additional air to the compressor 19. Also, if desired, there may be a connection 109 to a lever 110 of the fuel valve so that when additional speeds are required, the fuel valve 50 is opened and additional fuel is supplied to the burner 49. When the pressure in the cabin increases above a preselected value, the diaphragm moves in the opposite direction; thus moving the linkages and levers heretofore referred to in the opposite direction, and this results in opening the bypass valve 53, thus bypassing a greater percentage of hot gases and closing the valve 50, which cuts down the fuel supplied to the burner. This obviously results in a reduced speed of the primary compressor 16 and a reduction in the amount of fresh air supplied to the system.

Referring again to the pressure control means in the cabin 10, the pressure in the control chamber 103 is controlled by pilot valves 115 and 116, which are adapted to bleed excess pressure from the control chamber 103 in accordance with and in response to the operation of a pair of bellows bulbs 117 and 118, each of which is anchored at one end to the casing member 101, and at its other end to a lever 120. Each lever 120 is hinged at one end to the casing member 101 and is urged toward valve closing position at its outer end by a spring 121. The two pilot valves 115 and 116 embody metering pins which are carried by the bellows 117 and 118 or the levers 120, and which metering pins cooperate with the ends of tubes 122 branching from a conduit 123 connected to the atmosphere outside the cabin, as indicated. The interior of the bellows 118 is connected to outside atmosphere by means of a conduit 124 connected to the conduit 123. Thus the bellows 118 is responsive to a differential between ambient pressure and the pressure within the chamber 103; whereas, the bellows 117, which is a sealed bellows, is responsive to absolute pressure within the chamber 103.

Cabin air enters the control chamber 103 through a restricted orifice 126. A slight head of pressure within the cabin 10 over the pressure within the control chamber 103 will be normally maintained in order to induce such inflow. The bellows 117 and 118 through the operation of the valves 115 and 116, control the pressure within the chamber 103, which, through the operation of the diaphragm 102 and the means for operating the primary compressor at suitable speed, controls the pressure of the air in the cabin 10.

The conduit 14 and the conduit 18 are connected together as shown by air connection 130. Also there is a second ambient air inlet 131 closed by a check valve 132 when the system is operating to maintain pressures in the cabin 10. At other times the check valve 132 may be opened by rammed air flowing into the air inlet 131.

The coolers 20 and 23 may be of any suitable design, those illustrated herein being of the type in which ambient air is brought into heat transfer relation with the air passing through the system. The heaters 25 and 55 may be of any suitable type, such, for example, as those in which hot air is brought into heat transfer relation to the air flowing through the conduits 22 and 31.

I will now briefly describe the operation of my invention. Assuming that the system is in operation and is functioning to maintain the desired rate of flow and desired pressure in the cabin 10, the air is entering at 12 and exhausting at 14; the exhaust cabin air flows through the conduit 14 and is delivered to the compressor 30; the primary compressor 16 is in operation at this time and is supplying air to the compressor 19 through the conduit 18. There is in addition a flow of air between the conduit 18 and the conduit 14, such as may be required to supply any additional air to the compressor 30, which may be required by the power turbine means.

The cabin exhaust air, and any additional air which may be supplied to it, is compressed by the compressor 30, is passed through the heat exchanger 55 and past the burner 33, thus supplying additional heat and volume to the air. This air then is employed in the power turbine 32 as previously explained, and drives the compressors 19 and 30. The exhaust gases from the power turbine are employed, as previously pointed out, to operate the turbine 46 for driving the primary compressor 16.

The air compressed by the compressor 19 flows through the cooler 23 and is cooled, and then flows through the cooling turbine 24 where it is further cooled and expanded and delivered to the heater 25. This heater 25 heats the air as required, the amount of heating depending upon the position of the valve 58. This valve 58 may be manually controlled or may be controlled through a thermostat means located in the cabin. The air passes from the heater 25 through the conduit 22 and into the cabin, thus completing its circuit. Should the flow decrease below or increase above a predetermined value, the flow control means 65 is operated as previously pointed out, and operates the reversible motor 67 in order to readjust the position of the valve 34. Also, if the pressure in the cabin departs from its predetermined value, the pressure responsive means operates to adjust the position of the bypass valve 53 and the fuel valve 50, thus supplying greater or less driving gases to the driving turbine 46 and thus driving the primary compressor at a greater or less speed as required.

From the foregoing description, it will be seen that when once air is taken into the system and compressed, it is then used not only to supply the cabin with conditioned air, but it is also used in the power turbine means; and, in this way, the energy imparted to the air is used in the power turbine means. When the system is operating normally the air which is drawn into the means for replenishing air to the system is delivered primarily to the means for supplying conditioned air to the cabin, and there is normally no mixing of the cabin exhaust air with the fresh air supplied to the compressor 19. However, fresh air may be supplied as required through the bypass 130 to supplement the exhaust air supplied to the power means where additional air is required.

I have heretofore described and have illustrated one form of my invention which achieves all of the objects, features and advantages heretofore pointed out. It should be understood, however, that different alterations and modifications might be made without departing from the spirit and scope of my invention. I, therefore, do not wish to be limited to the details disclosed herein but wish my invention to be broadly construed in accordance with the statement of invention and in accordance with the claims which are directed to my invention in its entirety and in its important subcombinations.

I claim as my invention:

1. In an aircraft cabin air conditioning system, the combination of: cabin air supply means for supplying air to said cabin having a compressor; combustion turbine means for driving said compressor; exhaust air means for delivering all of the cabin air exhausted therethrough to said turbine means; air replenishing means for supplying air to said cabin air supply means; and an air connection between said air replenishing means and said exhaust air means through which air may flow so as to modify the pressure in said air exhaust means in accordance with air pressure in said air replenishing means.

2. In an aircraft cabin air conditioning system, the combination of: cabin air supply means for supplying air to said cabin having a compressor; power turbine means for driving said compressor; exhaust air means for delivering all of the cabin air exhausted therethrough to said power turbine means; means for raising the energy level of said cabin exhaust air upstream of said turbine; air replenishing means for supplying air to said cabin air supply means, having a compressor; control means for said last mentioned compressor, for driving same at such a rate as to supply replenishment to maintain the desired pressure in said cabin; and an air connection between said air replenishing means and said exhaust air means through which air may flow so as to modify the pressure in said air exhaust means in accordance with air pressure in said air replenishing means.

3. In an aircraft cabin air conditioning system, the combination of: cabin air supply means for supplying air to said cabin having a compressor; power turbine means for driving said compressor; exhaust air means for delivering cabin exhaust air to said power turbine means; an energy augmentor operatively associated with said exhaust air means; and air replenishing means for supplying air simultaneously to said cabin air supply means and to said power means.

4. In an aircraft cabin air conditioning system, the combination of: cabin air supply means for supplying air to said cabin having a compressor; power turbine means including a source of heat, a compressor and turbine means for driving both of said compressors; exhaust air means for delivering cabin exhaust air to said power turbine means; air replenishing means for supplying air to said cabin air supply means; and an air connection between said air replenishing means and said exhaust air means through which air may flow so as to modify the pressure in said air exhaust means in accordance with air pressure in said air replenishing means.

5. In an aircraft cabin air conditioning system, the combination of: cabin air supply means for supplying air to said cabin having a compressor; power turbine means including a compressor, fuel combustion means and turbine means for driving both of said compressors; exhaust air means for delivering cabin exhaust air to said power turbine means; and air replenishing means for supplying air simultaneously to said cabin air supply means and to said power means.

6. In an aircraft cabin air conditioning system, the combination of: cabin air supply means for supplying air to said cabin, having a compressor; power turbine means having turbine means and a compressor; drive means whereby said turbine means drives said compressors; exhaust air means for delivering exhaust air from said cabin to said compressor of said power turbine means; air replenishing means for supplying air to said compressor of said cabin air supply means, said air replenishing means having a compressor; turbine means for driving said last mentioned compressor; and cabin pressure sensitive means for controlling said last mentioned turbine means.

7. In an aircraft cabin air conditioning system, the combination of: cabin air supply means for supplying air to said cabin, having a compressor; power turbine means having turbine means and a compressor; drive means whereby said turbine means drives said compressors; exhaust air means for delivering exhaust air from said cabin to said compressor of said power turbine means; air replenishing means for supplying air to said compressor of said cabin air supply means; constant flow means for controlling said compressors of said cabin air supply means and said power turbine means for maintaining the desired rate of air flow.

8. In an aircraft cabin air conditioning system, the combination of: cabin air supply means for supplying air to said cabin, having a compressor; power turbine means having turbine means and a compressor; drive means whereby said turbine means drives said compressors; exhaust air means for delivering exhaust air from said cabin to said compressor of said power turbine means; air replenishing means for supplying air to said compressor of said cabin air supply means; constant flow means for controlling said compressors of said cabin air supply means and said power turbine means for maintaining the desired rate of air flow; and control means for causing said air replenishing means to supply air at such a rate as to maintain the desired air pressure in said cabin.

9. In an aircraft cabin air conditioning system, the combination of: cabin air supply means for supplying air to said cabin, having a compressor; power means including a turbine, a fuel burner, and a compressor; drive means whereby said turbine means drives said compressors; exhaust air means for delivering exhaust air from said cabin to said compressor of said power turbine means; air replenishing means for supplying air to said compressor of said cabin air supply means; and an air connection between said air replenishing means and said exhaust air means through which air may flow so as to modify the pressure in said air exhaust means in accordance with air pressure in said air replenishing means.

10. In an aircraft cabin air conditioning system, the combination of: a pair of compressor means in amplifying relationship and both operating to supply air to the cabin; individual means for driving each of said compressor means; a control means for one of said compressor means responsive to cabin pressure so that predetermined pressure conditions will be maintained in the cabin; and control means for the other of said compressors responsive to flow of air into the cabin.

11. In an aircraft cabin air conditioning system, the combination of: first compressor means for delivering a flow of air into the cabin; air utilizing means having duct means for connecting its inlet to said cabin so as to receive all of the air exhausting through said duct means from said cabin; second compressor means having its outlet only connected to said duct means; and independent control means for said second compressor means for controlling operation of the same so that the magnitude of the flow of air delivered by said second compressor means to said duct means will determine the pressure in said cabin.

12. In an aircraft cabin air conditioning system, the combination of: compressor means for delivering a flow of air into the cabin; air utilizing means having duct means for connecting its inlet to said cabin so as to receive all of the air exhausting through said duct means from said cabin; second compressor means having its outlet connected to the inlet of said first named compressor means and to said duct means; and control means for said second compressor means for controlling operation of the same so that the magnitude of the flow of air delivered by said second compressor means to said duct means will determine the pressure in said cabin.

13. In an aircraft cabin air conditioning system, the combination of: compressor means for delivering a flow of air into the cabin; internal combustion power generating means having duct means for connecting its inlet to said cabins so as to receive all of the air exhausting through said duct means from said cabin; second compressor means having its outlet connected to said duct means; power transmission means connecting said power generating means to at least one of said compressor means to drive the same; means responsive to the flow of air to said cabin from said first named compressor means for determining the speed of said first named compressor means; and means responsive to cabin pressure for determining the speed of said second compressor means.

14. In an aircraft cabin air conditioning system, the combination of: compressor means for delivering a flow of air into the cabin; a pair of internal combustion power generating means having duct means for connecting their inlets to said cabin so as to receive air from said cabin; second compressor means having its outlet connected to said duct means; power transmission means connecting said power generating means respectively to said compressor means to drive the same; means responsive to the flow of air to said cabin from said first named compressor means for determining the speed of said first named compressor means; and means responsive to cabin pressure for determining the speed of said second compressor means.

HOMER J. WOOD.

REFERENCES CITED

The following references are of record in the file of this patent:

UNITED STATES PATENTS

| Number | Name | Date |
|---|---|---|
| 2,002,057 | Gregg | May 21, 1935 |
| 2,119,402 | Puffer | May 31, 1938 |
| 2,284,984 | Nixon et al. | June 2, 1942 |
| 2,297,495 | Pfau | Sept. 29, 1942 |
| 2,391,486 | Smith | Dec. 25, 1945 |
| 2,391,838 | Kleinhans et al. | Dec. 25, 1945 |
| 2,405,670 | Price | Aug. 13, 1946 |
| 2,414,202 | Jepson et al. | Jan. 14, 1947 |